United States Patent
Cole

(10) Patent No.: US 6,601,574 B1
(45) Date of Patent: Aug. 5, 2003

(54) CATAPULT ASSEMBLY

(76) Inventor: Geoffrey Arthur Cole, Ramiad, Bank Creek Road, Braidwood, NSW 2622 (AU)

(*) Notice: Subject to any disclaimer, the term of this patent is extended or adjusted under 35 U.S.C. 154(b) by 184 days.

(21) Appl. No.: 09/621,192

(22) Filed: Jul. 21, 2000

(30) Foreign Application Priority Data

Jul. 22, 1999 (AU) ............................................. PQ 1793

(51) Int. Cl.[7] ................................................. F41B 3/00
(52) U.S. Cl. ........................................... 124/17; 124/16
(58) Field of Search ................................. 119/712, 427; 124/6, 7, 16, 17, 35.1; 43/3; 160/313, 315; D6/575, 576

(56) References Cited

U.S. PATENT DOCUMENTS

| | | | | |
|---|---|---|---|---|
| 2,282,315 A | * | 5/1942 | Adams | |
| 2,646,785 A | | 7/1953 | Goldman | |
| 2,696,249 A | * | 12/1954 | Prokop et al. | |
| 3,080,850 A | * | 3/1963 | Schrougham | |
| 3,205,118 A | * | 9/1965 | Guffan | |
| 3,777,733 A | * | 12/1973 | Mitchell | |
| 4,307,529 A | * | 12/1981 | White et al. | |
| D296,430 S | * | 6/1988 | McConnell | |
| 5,067,471 A | | 11/1991 | Kim | 124/21 |
| 5,694,913 A | | 12/1997 | Parrott | 124/17 |
| D415,382 S | * | 10/1999 | Walker | |
| 5,983,551 A | | 11/1999 | Lalor | 42/105 |

* cited by examiner

Primary Examiner—John A. Ricci
(74) Attorney, Agent, or Firm—Testa, Hurwitz & Thibeault, LLP.

(57) ABSTRACT

This invention deals with several aspects in relation to training of retriever dogs and conducting field trials and hunt tests. In one aspect, this invention provides a catapult assembly including a launching pouch, tensioning bands for the pouch, and a carriage movable between first and second positions. The pouch and carriage are connected at or near the first position. A machine screw is used for drawing the connected pouch and carriage to or near the second position while tensioning the tensioning bands. A drum is used for automatically feeding a retrieving object into the pouch when at or near the second position. A crossbow release mechanism is used to catapult the retrieving object.

15 Claims, 14 Drawing Sheets

CATAPULT ASSEMBLY

CROSS REFERENCE TO RELATED APPLICATIONS

This application claims priority to Australian application number PQ 1793, filed Jul. 22, 1999.

FIELD OF THE INVENTION

This invention relates to a catapult assembly. In particular, this invention relates to an assembly suitable for training retriever dogs or for use in field trials and hunt tests.

BACKGROUND OF THE INVENTION

The training of retriever dogs has traditionally involved throwing an object, such as a duck, a pigeon or a retrieving dummy, and practising the retrieving dog in retrieving the object. The proficiency of retriever dogs can be measured in field trial or hunt tests, which are basically types of simulated hunting tests for dogs.

In the past, it has been common for a retrieving object to be simply thrown by hand. This is labour intensive and usually involves several assistants for the trainer.

In another form of prior art, the birds or dummies to be retrieved have been ejected into the air by single shot, manually loaded catapults. These generally require two or more people to operate efficiently and consequently restrict the ability of a single trainer to train or practise his dogs for field trials and hunt tests. In addition, prior art catapults need to be manually loaded after one shot.

It is an aim of the present invention to overcome or substantially alleviate some or all of the disadvantages suffered by the prior art.

SUMMARY OF THE INVENTION

This invention deals with several aspects in relation to training of retriever dogs and conducting field trials and hunt tests. In one aspect, this invention provides a catapult assembly including:

a launching pouch;

tensioning means for the pouch;

a carriage movable between first and second positions;

means for connecting the pouch to the carriage at or near the first position;

means for drawing the connected pouch and carriage to or near the second position while tensioning the tensioning means;

means for automatically feeding a retrieving object into the pouch when at or near the second position; and release means for disconnecting the pouch from the carriage.

In the assembly of the invention, the launching pouch preferably comprises a cradle of aluminium or the like. To reduce weight, the aluminium cradle may include a plurality of apertures. The launching pouch may be made of any other suitable material.

The tensioning means may take any desirable form but, in a preferred embodiment, the tensioning means comprises a plurality of strong elastic or rubber bands, optionally operated via pulleys. While the invention is not limited in this respect, the preferred number of bands is four since it is believed that this can provide smoothness in launching the retrieving object from the pouch. However, the assembly of the invention can cater for retrieving objects of different weights. In the case of retrieving objects which are relatively heavy, such as ducks, it may be desirable to use more than four bands, for example, six bands. The bands may be flat or round, or a mixture of these shapes.

When the tensioning means comprises rubber bands, each is preferably anchored in a suitable location and attached to the pouch by a rope and pulley system. In another embodiment, each rubber band may be mounted on a roller situated near the pouch. It is a further option to include a guide to ensure, as far as possible, that the rubber bands are retained in position on the rollers when the pouch is launched.

The means for drawing the connected power and carriage to the region of the second position may also comprise any suitable means. In the preferred embodiment described in the drawing, these means include a machine screw driven by an electric motor powered by a battery.

The means for automatically feeding a retrieving object into the pouch when the pouch is in the region of the second position is preferably capable of holding a plurality of retrieving objects, for example, six retrieving objects. These means may include a number of cylinders, such as six, preferably arranged in a circular pattern on a pair of plates, which form a drum. In this embodiment, each cylinder is open at each end. Continuing with this embodiment, the drum is mounted over a base plate which comprises a disc with one cylinder-shaped cut-out (the edges of which are slightly curved so that there are no sharp edges to cause damage to the retrieving objects). To automatically feed a retrieving object from the automatic feeding means into the pouch, the drum is rotated by suitable means until one of the cylinders lines up with the cut-out in the base plate. The retrieving object which has been previously inserted in that cylinder then falls, through the influence of gravity, into the pouch. The assembly is then ready for release of the pouch from the carriage so that the retrieving object can be thrown in the desired manner. The means for rotating the drum in this embodiment may be any suitable means. One example is described in connection with the drawings, below.

Preferably, the drum containing the cylinder is demountable from the assembly for transportation, as may the base plate. It is also preferred that the drum is supplied in at least two different sizes so far as the cylinders are concerned. In this way, the assembly of the invention can be used to catapult game of different sizes. For example, the cylinders of one drum may be sized to accept pigeons, while the cylinders of a larger drum may be sized to accept ducks or pheasants.

It is also preferred that the drum is easily changed in the field, preferably without the need of tools.

The carriage is preferably assembled on a frame. In this embodiment, the pouch is located at an upper end of the frame and accordingly the first position is at the upper end. It is also preferred that the second position represents the "cocked" position and that this is located at the lower end of the frame.

The means for connecting the pouch to the carriage at or near the first position may take any desirable form. One particularly preferred form is described below in connection with the drawings. In that embodiment, a hook on the back of the pouch is connected by means of a latch to the carriage. In this embodiment, the release means include a trigger which causes the latch to disconnect from the hook, thus releasing the pouch. The release means may be the same as or similar to known cross-bow release mechanisms.

It is greatly preferred that the catapult assembly of the invention is capable of remote control. In particular, it is desirable that the apparatus of the invention can be controlled remotely to operate the release means to release the pouch. For example, a radio frequency receiver may be attached to or communicate with the electric motor, so that the motor can be controlled by a remote radio transmitter.

Preferably, the assembly of the invention is mounted on wheels and is demountable for transportation. It is contemplated that, at least in some embodiments, the assembly of the invention can be demountable into a form which will fit into the trunk of a typical vehicle. In one embodiment, to demount the assembly of the invention, the battery is removed and may have a handle to facilitate this purpose. The wheels supporting the carriage may be removed and the wheel-holding structure collapsed in the same manner as for a known hand-drawn golf buggy. The folded structure, if desired, may be held down with one or more straps. It may be possible to demount the assembly without the need for any tools.

The battery in this embodiment may be mounted in a cradle for easy removal during transportation. The method of mounting and demounting the battery in the cradle can be any suitable method, including those presently used in relation to battery-operated golf buggies. In this embodiment, the battery may be mounted on a cradle on a brace set between a pair of wheels for the assembly, or on a frame for the assembly.

In another aspect, this invention is concerned with training or trialing dogs to retrieve game shot by another person in the field.

Traditionally, in this type of situation, a dog handler or trainer has a dog at heel. There is present also in the field a second person, generally dressed in a white jacket. The second person throws by hand a game object and fires at the object, so that the dog can observe other people hunting. In trials, on command from the handler, the dog is sent to retrieve the object thrown by the other person.

This aspect of the invention is predicated on the concept that it is desirable to simulate the presence of a second person in the field. Further, it is desirable to be able to introduce the presence of that person or to remove it at desired times during trials or training, so that, so far as the dog is concerned, the person appears or disappears (retired gun).

For this purpose, the invention provides, in this further aspect, a training device which includes a silhouette, preferably mounted on a suitable backing material, the silhouette being collapsible. It is particularly preferred that the training device is adapted to be mounted on the catapult assembly of the invention and to be operable in conjunction with the catapult assembly.

The silhouette is preferably coloured white and effected by overlaying or painting on the suitable backing material. By way of example of suitable backing material, the type of woven metal or plastic mesh used in flyscreens may be mentioned. The invention, however, is not limited to this embodiment.

The training device preferably has an upper and a lower frame, with a roller mounted on the upper frame. When closed, the training device may be relatively compact, with the upper frame and the lower frame in close conjunction and the roller situated therebetween. The silhouette and the backing material, if present, are preferably mounted between the lower frame and the roller and adapted to be wound around the roller or unwound from it, as the case may be.

In this embodiment, activation of the training device of the invention to the "other person present" configuration involves urging the upper frame and roller away from the lower frame, at the same time causing the roller to rotate and unwinding the silhouette so that it is revealed. Conversely, activation of the training device of the invention to the configuration where the "other person" is not present involves rolling up the silhouette on the roller, the upper frame moving towards the lower frame during this procedure, until the upper frame and roller meet the lower frame.

In a particularly preferred embodiment, the training device of the invention has tensioning means, such as an elastic cord, urging the upper frame towards the lower frame. It is also preferred that the training device of the invention has means such as a leaf spring, urging the lower frame away from contact with the upper frame. These elements can assist in the activation of the device of the invention to the two configurations described.

In yet a further aspect, this invention is concerned with a new retrieving object casing suitable for use with the assembly of the invention.

It should be explained that in training and trials for retriever dogs, the retrieving object is normally a bird, such as a pigeon, duck or pheasant, or a retrieving dummy. In the case of ducks or pheasants, these birds have considerably more weight than pigeons and may be launched from the catapult assembly of the invention without any problem. However, in the case of pigeons and sometimes in the case of game birds, it is found that in some instances a pigeon, being of a relatively low body weight, will fall forward in the pouch after having been fed through the automatic feeding means. As a consequence, the pigeon is not properly located in the pouch and launching the pouch does not always cause the pigeon to throw in the desired manner. This aspect of the invention addresses this problem.

Accordingly, the invention provides, in this further aspect, a game casing adapted to embrace an item of game such as a pigeon or game bird to enable the item of game to be appropriately located in a launching pouch in a catapult assembly. Preferably, the catapult assembly is the catapult assembly of the present invention. For convenience, the game casing of the invention will be described in relation to the catapult assembly of the invention but it is to be appreciated that the game casing is not necessarily limited to that environment.

The game casing may be attached to the pouch or separate therefrom. When attached to the pouch, the game casing preferably comprises an incomplete cylinder, made of suitably flexible material, the cylinder being incomplete by reason of a slit or opening along its length. In this embodiment, the slit or opening is located in the game casing upwardly of the launching pouch, so that an item of game embraced by the incomplete cylinder can be projected forwards from the launching pouch via the slit or aperture. It will be appreciated that the material of the game casing, at least in the region of the slit or aperture, needs to be sufficiently flexible so that the launching of the game item from the launching pad is not impeded. Thus, the force applied to the game item during the catapult operation should be sufficient to force apart the walls of the cylinder on each side of the slit or aperture, permitting launching of the game item out of the incomplete cylinder and ensuring a proper flight.

In this embodiment, an item of game such as a pigeon may be fed from a cylinder in the automatic feeding means of the catapult assembly of the invention, into the incomplete cylinder attached to or integral with the launching pouch, the respective cylinders being aligned for this purpose.

In another embodiment, the game casing is separate from the launch pouch. In this embodiment, it is preferred that the game casing has a cup-like base surrounding by a plurality of fingers which, more preferably, flare out from the base. A game item such as a pigeon may be placed inside the casing in this embodiment, with the legs and tail of the pigeon protruding above the flared fingers. The game item (eg. the pigeon or game bird) is preferably inserted in this form of the casing before being fed into a cylinder of the automatic feeding means of the catapult assembly of the invention. The game item together with the casing are then loaded, in due course, into the launching pouch and both the casing and the game item are launched from the catapult assembly. In flight, the casing, which is a loose fit around the game item, falls away from the game item which has considerably greater body weight and does not impede flight. The game casing can be retrieved by the trainer/handler for re-use as desired.

Conveniently, the game casing of the invention in the latter embodiment described above may be formed from the base of a "P.E.T." beverage bottle of one litre capacity or larger, which beverage bottle is well-known. The beverage bottle is cut in half and the upper portion, containing the neck of the bottle, is discarded. The bottom portion already has a base which can comprise the cup-like base of this embodiment of the game casing of the invention. Using scissors or other suitable tool, cuts may be made from the upper part of the bottom portion of the drink bottle towards the cup-like base. This will result in the formation of a plurality of fingers, which tend to flare out and result in an ideal receptacle for embracing a pigeon or game bird. During development of the catapult assembly of the invention, it was found that known retrieving dummies can produce poor results when catapulted from the assembly of the invention. A new retrieving dummy has been devised for use with the assembly of the invention. Accordingly, this invention provides, in yet a further aspect, a retrieving dummy having an elongated body, a nose at one end of the body, the nose being at least partly tapered, one or more fins or flights connected to the opposite end of the body, the dummy having a centre of gravity closer to the nose than the fins or flights.

The dummy may be made of any suitable material—preferably robust enough to enable the dummy to be used a substantial number of times without deterioration.

BRIEF DESCRIPTION OF THE DRAWINGS

The invention will now be described in its several aspects by reference to the attached drawings, in which.

DETAILED DESCRIPTION OF THE INVENTION

Figure 1:
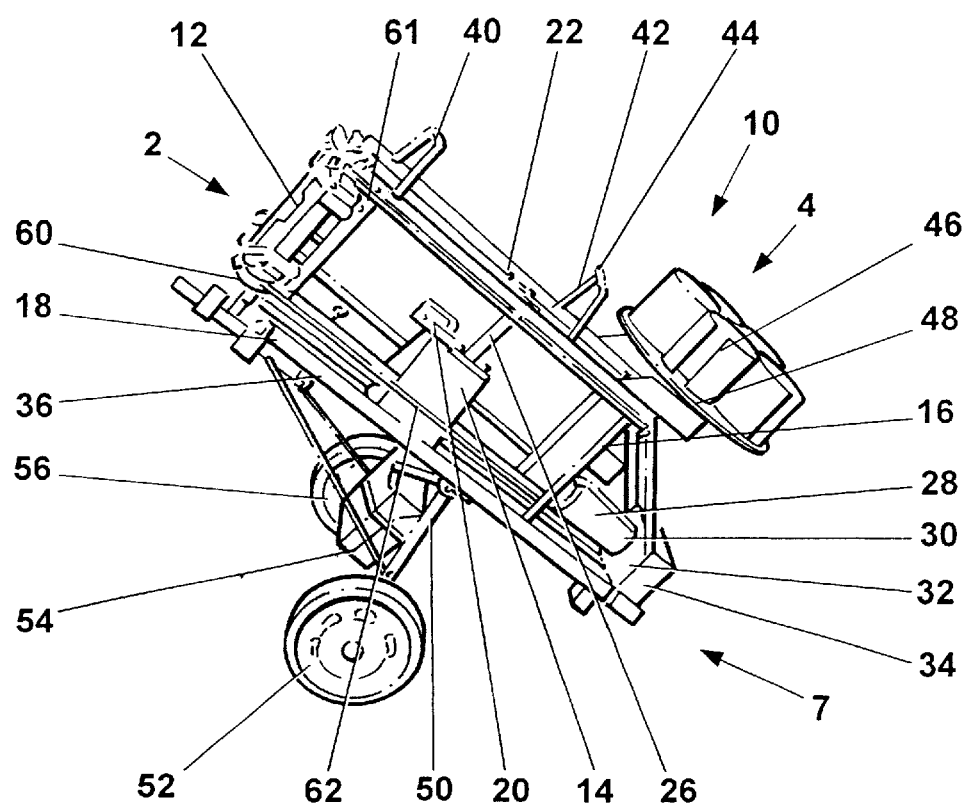
FIG. 1 is a side perspective view of a preferred embodiment of the catapult assembly of the invention.
Figure 2:
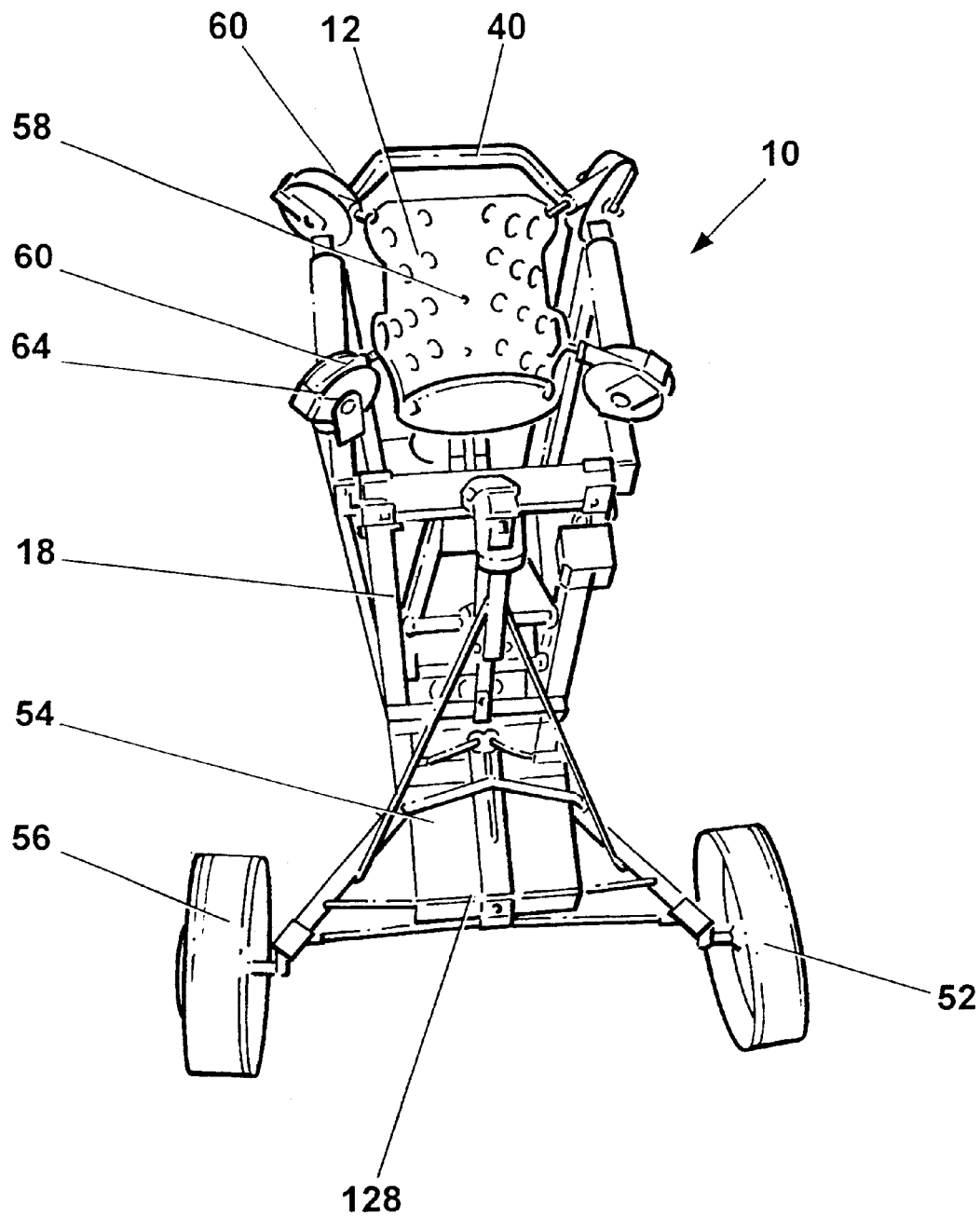
FIG. 2 is a perspective view of the assembly of FIG. 1, looking in the direction of the arrow 2 in FIG. 1.
Figure 3:
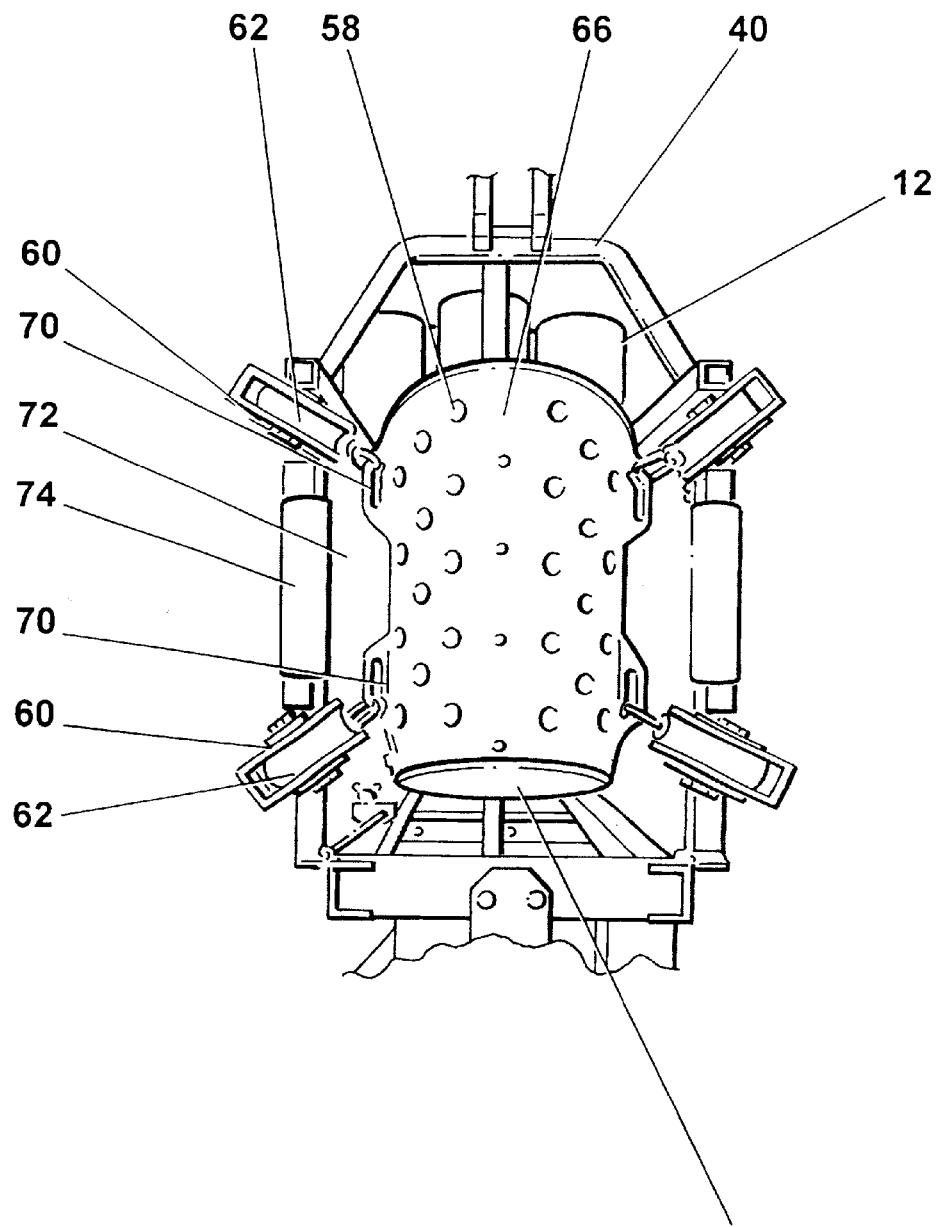
FIG. 3 is a plan view of the launching pouch of the assembly of the invention.

Turning first to FIG. 1, catapult assembly 10 has launching pouch 12, which is shown in more detail in FIGS. 2 and 3. Catapult assembly 10 also includes carriage 14 which is movable between an upper position near launching pouch 12 and a lower position near strut 16 of frame 18. Carriage 14 has connecting means 20 as well as protrusion 22 on bar 24 (see FIG. 10), carried on carriage 14 by support 26. Protrusion 22 cooperates with a mechanism for automatically feeding a retrieving object (not shown) into pouch 12, as will be explained below. Electric motor 28 together with in-line gear 30 are mounted on base 32, below which is a housing 34. Motor 28 drives a machine screw (in this view hidden by channel 36 of frame 18) to move carriage 14 from the upper to the lower position and vice versa. A radio frequency receiver (not shown) is located beneath housing 34 and transmits a signal to assembly 10 as will be explained hereafter.

Frame 18 includes a pair of handles/braces 40 and 42. Handle 42 has attached to it, in this view, a spigot 44 so that the training device of the invention can be mounted on catapult assembly 10 (refer description in connection with FIGS. 11, 12 and 14).

Mounted on frame 18 is drum 46 and base plate 48.

Frame 18 is supported on A-frame 50 which has a pair of wheels 52 and 56. Battery 54 is mounted on a strut between wheel 52 and wheel 56.

Turning now to FIG. 2, which is the assembly of FIG. 1 viewed in the direction of arrow 2 in FIG. 1, it can be seen that launching pouch 12 is made of aluminium and contains a number of apertures (for example, shown at 58). Launching pouch 12 has near each of its corners a roller 60 over which travels elastic 62 (refer also FIG. 1 in this regard). Safety guide 64 is mounted on each of rollers 60 to ensure that elastic 62 is retained on each of rollers 60 after pouch 12 has been launched.

Turning now to FIG. 3, which is a plan view of pouch 12, pouch 12 is shown at rest in the upper position in frame 18. Pouch 12 has an arcuate base 66 with a generally upstanding or perpendicular wall 68, located at the lower end of pouch 12 when pouch 12 is in position on assembly 10. Each roller 60 is attached to an elastic rope 62 via lug 70. Each elastic travels over roller 60 before descending towards the lower end of assembly 10, where each elastic 62 is hooked or otherwise secured to assembly 10, for example, on strut 16 (refer FIG. 1).

Pouch 12 is illustrated affixed to four elastics 62. Pouch 12 in this embodiment has provision to accept two extra elastics 72, one of which is shown in dashed outline in FIG. 3. Such an extra elastic 72 may be clipped, via a bar hook (not shown) into each of adjacent lugs 70, then led over roller 74 and attached near the lower end of assembly 10, in a similar manner to elastic 62. Although extra elastic 72 is shown as a flat band in this illustration, and hence roller 74 is elongated, extra elastic 72 could in fact resemble elastic 62 which is circular in cross-section. In that case, roller 74 would resemble roller 60. The purpose of adding extra elastic 72 (and it would be necessary to add extra elastic 72 on both sides of pouch 12, although only one is illustrated), is to accommodate heavy retrieving objects, such as ducks or pheasants.

Elastics 62 (and extra elastics 72, if present) can be easily removed from pouch 12 by unhooking from lugs 70, so that pouch 12 can be removed from assembly 10 if desired. It will be appreciated that it can be a simple matter to add extra elastics 72 in the field, without tools, using a flat hook bar connecting into lugs 70.

Although not illustrated in FIGS. 2 and 3, an alternate arrangement to the use of elastic rope 62 is useful. In the alternate arrangement, each roller 60 is attached to a cord via lug 70, the cord travelling over roller 60 before descending towards the lower end of assembly 10, where each cord returns around a pulley before being joined to an elastic strip which is hooked or otherwise secured to assembly 10. The use of the cord and pulley system while retaining the elastic strip as the tensioning means can overcome problems in excessive rebound which may be encountered in the case of elastic rope 62.

Four or six of the cord and pulley systems may be attached to pouch 12 and may also be detachable from pouch 12 in a similar manner to that described above in connection with elastics 62.

Figure 4:
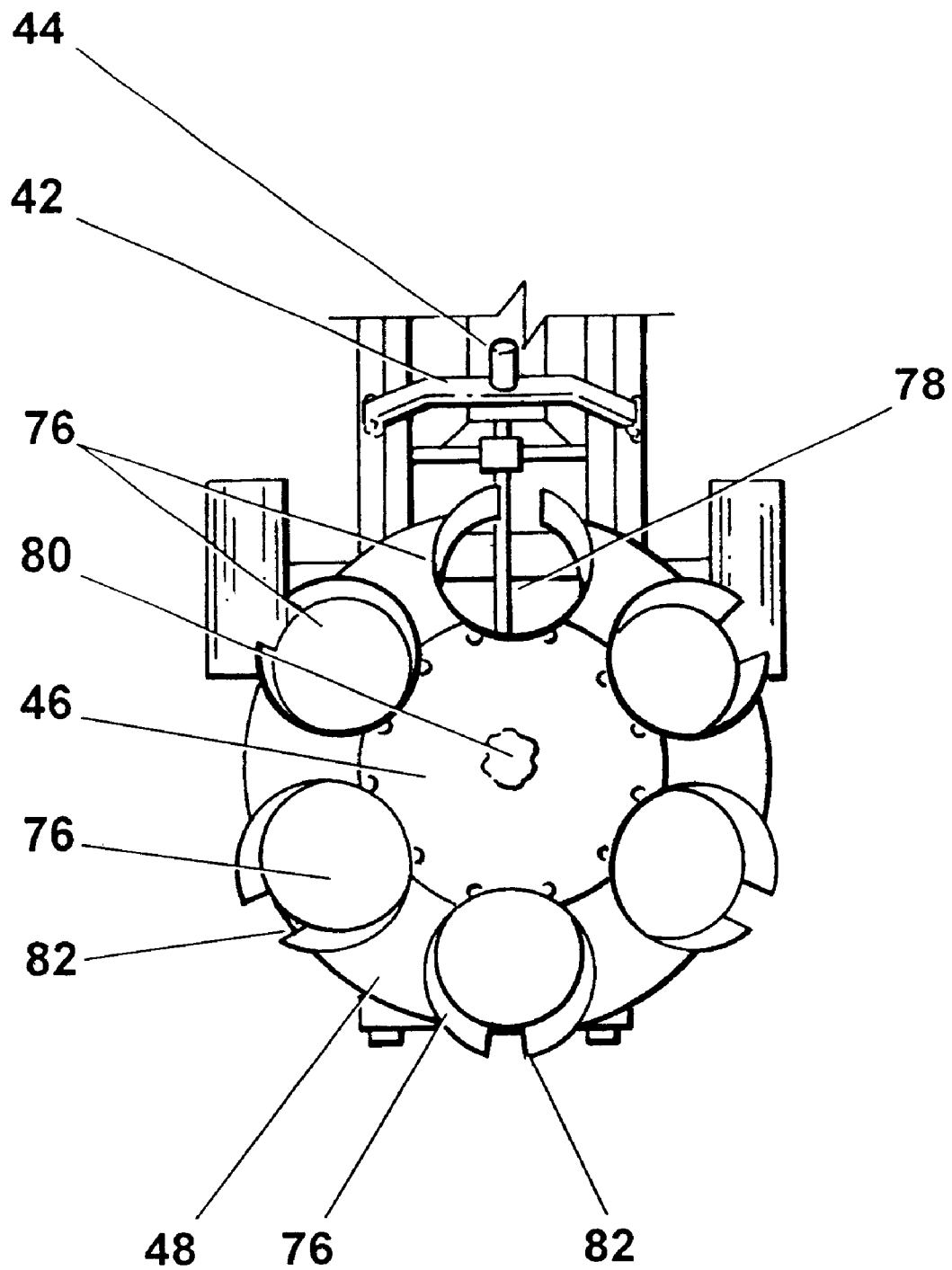
FIG. 4 is an elevation of the assembly of FIG. 1, looking in the direction of the arrow marked 4 in FIG. 1.

In FIG. 4 the view is from above drum 46, which has around its circumference six cylinders 76 (open at each end). Base plate 48 is seated below drum 46. As illustrated, cut-out 78 on base plate 48 is aligned with one of cylinders 76.

Figure 6:
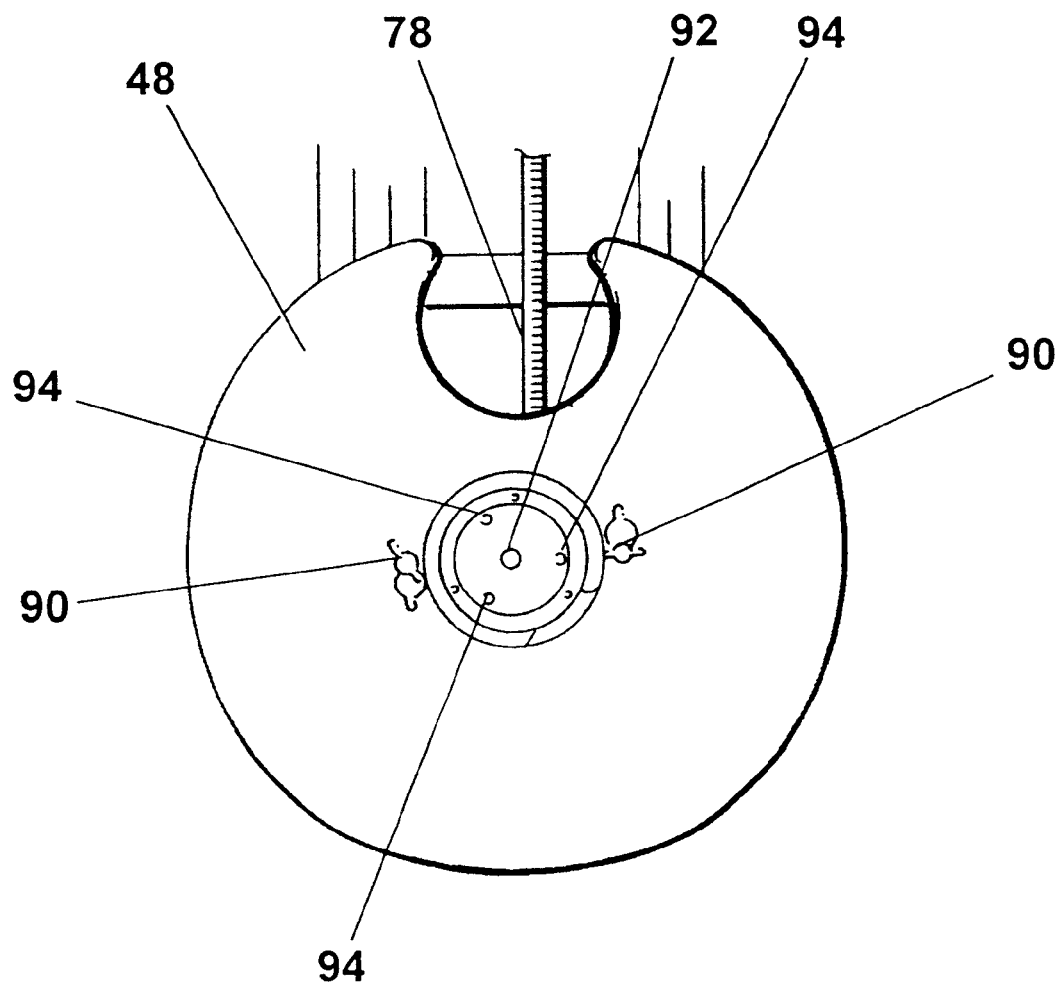
FIG. 6 shows the base plate of FIG. 5 mounted on a hub.

Drum 46 contains a central shaft through which locking bolt 80 is inserted to secure drum 46 to a hub (refer FIG. 6). Each of cylinders 76 includes a longitudinal slit 82.

Figure 5:
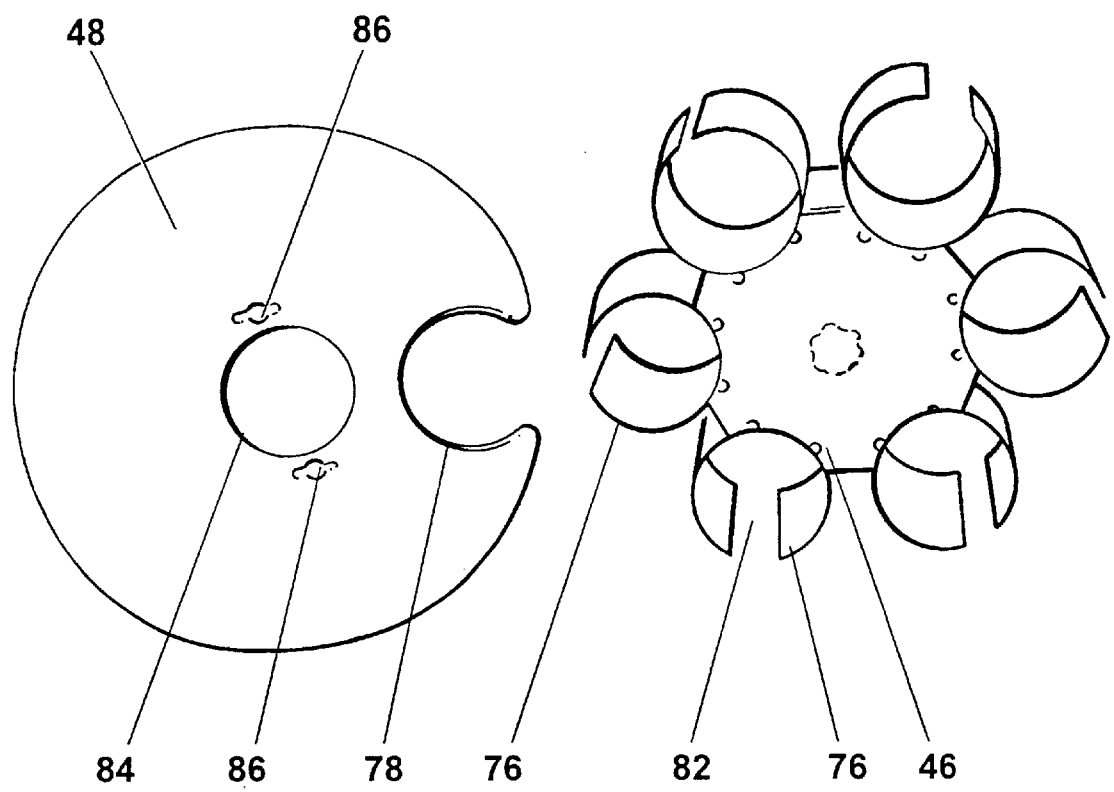
FIG. 5 shows in plan view a detail of the automatic feeding means, with the drum separated from the base plate.

In FIG. 5, locking bolt 80 has been removed from its connection with the hub and base plate 48 has also been removed from the hub. Locking bolt 80 has been reinserted in the central shaft of drum 46 in this illustration, although locking bolt 80 is not connected to the hub.

Base plate 48 is a disc with cut-out portion 78 on its circumference. Base plate 48 also has a central aperture 84. As will be seen from FIG. 6, central aperture 84 fits over the hub. Base plate 48 also includes wing-nut shaped apertures 86.

In FIG. 6, base plate 48 is shown secured to hub 88 by wing-nuts 90 which have been inserted through wing-nut shaped apertures 86 and tightened. Drum 46, of course, is not shown in this illustration but would be mounted over base plate 48 by inserting locking bolt 80 through the central shaft in drum 46 and into central aperture 92 on hub 88. Locating lugs 94 on hub 88 are for the purpose of locating apertures (not shown) on the underneath of drum 46.

It will be appreciated that drum 46 and base plate 48 are readily removable from assembly 10, for ease of transportation or for changing in the field drums accommodating larger or smaller retrieving objects.

Figure 7:
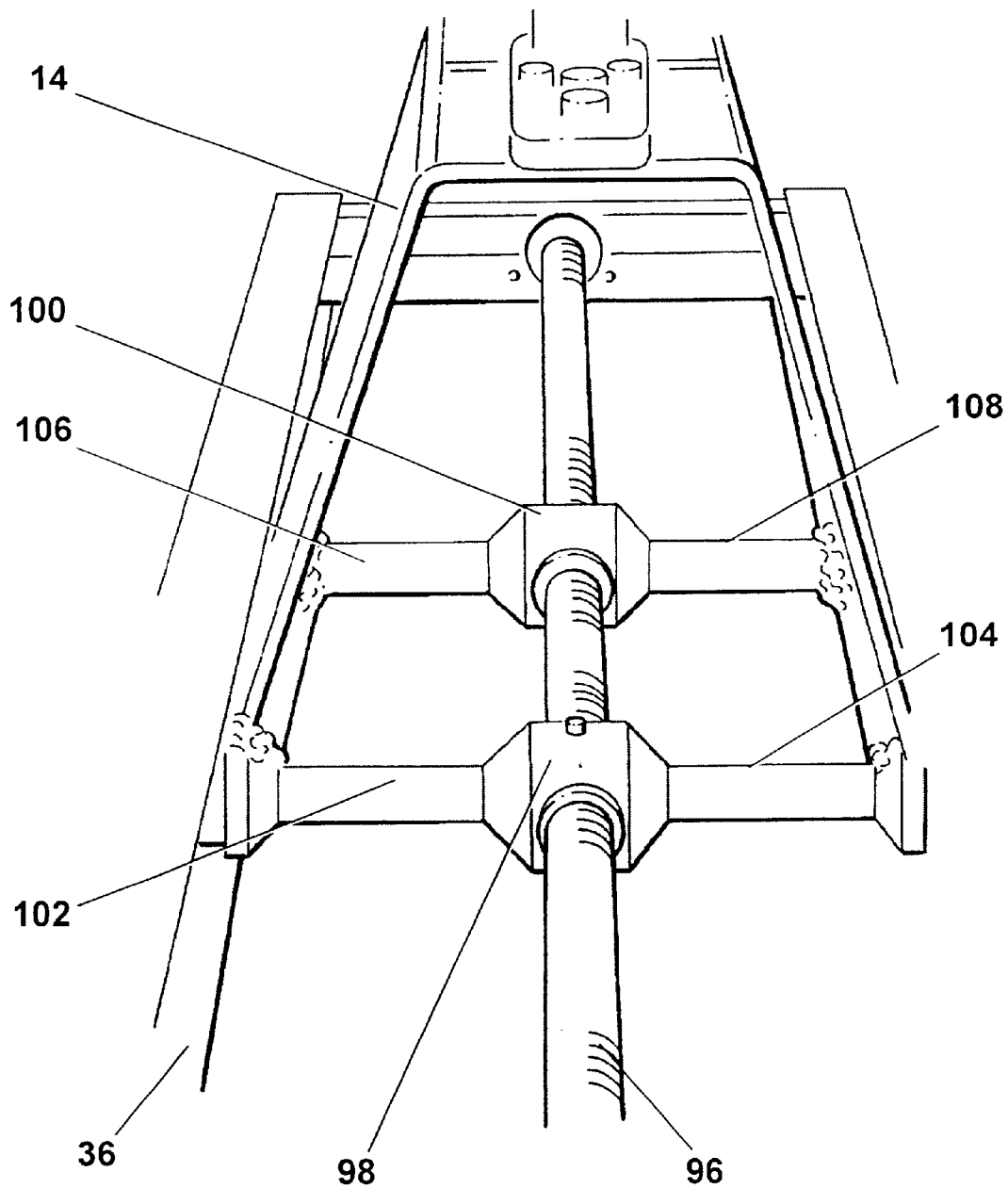
FIG. 7 shows a detail of the machine screw and carriage, looking in the direction of arrow 7 in FIG. 1.

Turning now to FIG. 7, this Figure shows machine screw 96 which runs through hubs 98 and 100, which provide the central point for axles 102 and 104 and 106 and 108 respectively. Bearings are located at the end of axles 102, 104, 106 and 108.

Carriage 14 is mounted at the ends of axles 102 and 104 and thus can be driven upwardly or downwardly in assembly 10, according to the direction of rotation of machine screw 96.

To drive machine screw 96, electric motor 28, powered by battery 54, via in-line gear 30, drives a belt-driven pulley (not shown) located inside housing 34 below base 32 (refer FIG. 1). The pulley is also attached to the base of worm screw 96 and thus activation of the motor 28 will cause worm screw 96 to rotate in one of two directions. In one direction, machine screw 96 drives carriage 14 upwardly towards the first position near the top of assembly 10, while in the other direction machine screw 96 draws back carriage 14 towards the second position near the base of assembly 10.

At the upper end of frame 18 is a plunger switch (not shown). When machine screw 96 drives carriage 14 to the upper end of frame 18, the plunger switch is depressed by carriage 14 and the polarity of motor 28 is reversed. Accordingly, machine screw 96 reverses its direction of rotation and draws back carriage 14 from the upper part of frame 18 towards the lower part.

Figure 8:
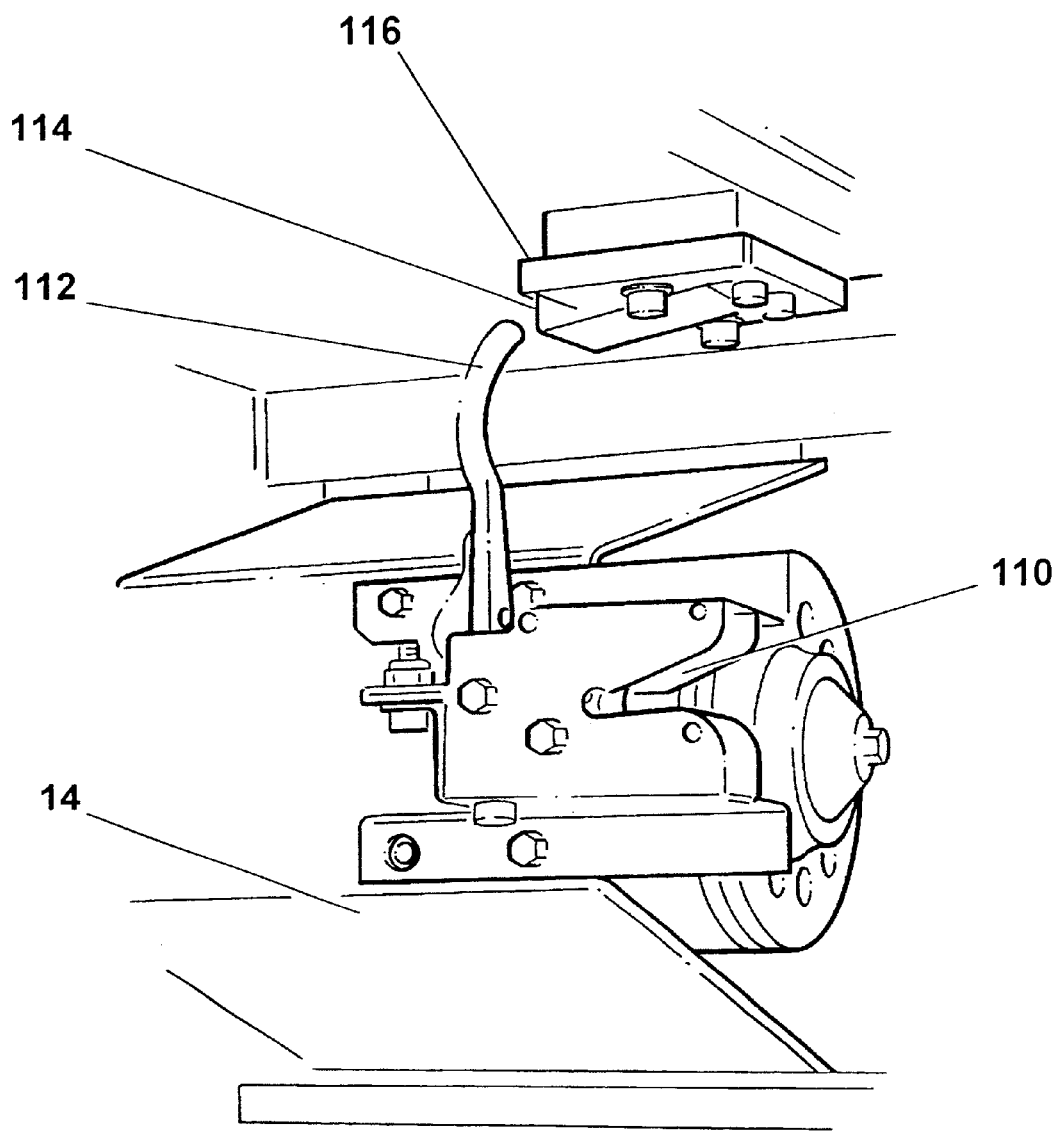
FIG. 8 shows a detail of the means for connecting the pouch to the carriage and the release means, as seen from the direction of arrow 4 in FIG. 1.

FIG. 8 shows a detail of connecting means 20 on carriage 14. Mounted atop carriage 14 are means for connecting the pouch 12 to the carriage 14 at or near the first position. These means include a slot 110 adapted to receive a hook (not shown) fixed to the underneath of pouch 12. When carriage 14 travels up assembly 10 under the influence of machine screw 96, the hook at the base of pouch 12 is received in slot 110 and a latch (not shown) automatically closes to trap the hook in slot 110. At the same time, carriage 14 depresses the plunger switch referred to above and machine screw 96 reverses its direction of rotation. Because the hook at the base of pouch 12 is trapped within slot 110 on carriage 14, pouch 12 is drawn back against the tension exerted through the elastics 62 (and 72 if present). As carriage 14 nears the base of assembly 10, trigger 112 traverses angled spring 114. The pressure of trigger 112 on spring 114 causes spring 114 to depress towards part 116 to allow the passage of trigger 112. As soon as the pressure applied by trigger 112 to spring 114 is released, i.e., when trigger 112 has passed spring 114, spring 114 reverts to its original position, thus providing a barrier to trigger 112 passing spring 114 in the upward direction.

It will be appreciated that, in FIG. 8, carriage 14 is shown in the second position, i.e., near the base of assembly 10. It will also be appreciated that, for the sake of simplicity, pouch 12 is not shown. However, in use pouch 12 will have been drawn back to the base of assembly 10 via connection of the hook on pouch 12 in slot 110.

When carriage 14 reaches the position described, it will depress a switch (not shown) and stop motor 28. There are a series of relays located within housing 34 along with the pulley described above. The relays control the stopping position of carriage 14.

By this stage, a retrieving object has been automatically loaded into pouch 12, in a manner to be described below.

To launch a retrieving object from pouch 12, motor 28 is activated—for example, by a radio signal from a remote transmitter—and machine screw 96 causes carriage 14 to move forward a little. Trigger 112 then encounters spring 114. Further forward movement of carriage 14 causes trigger 112 to be dragged back, thus releasing the latch retaining the hook at the base of pouch 12 in slot 110. Pouch 112 is launched under the force supplied by the tension on elastics 62 (72) and the retrieving object in pouch 12 is catapulted into the air. . . . .

Figure 9:
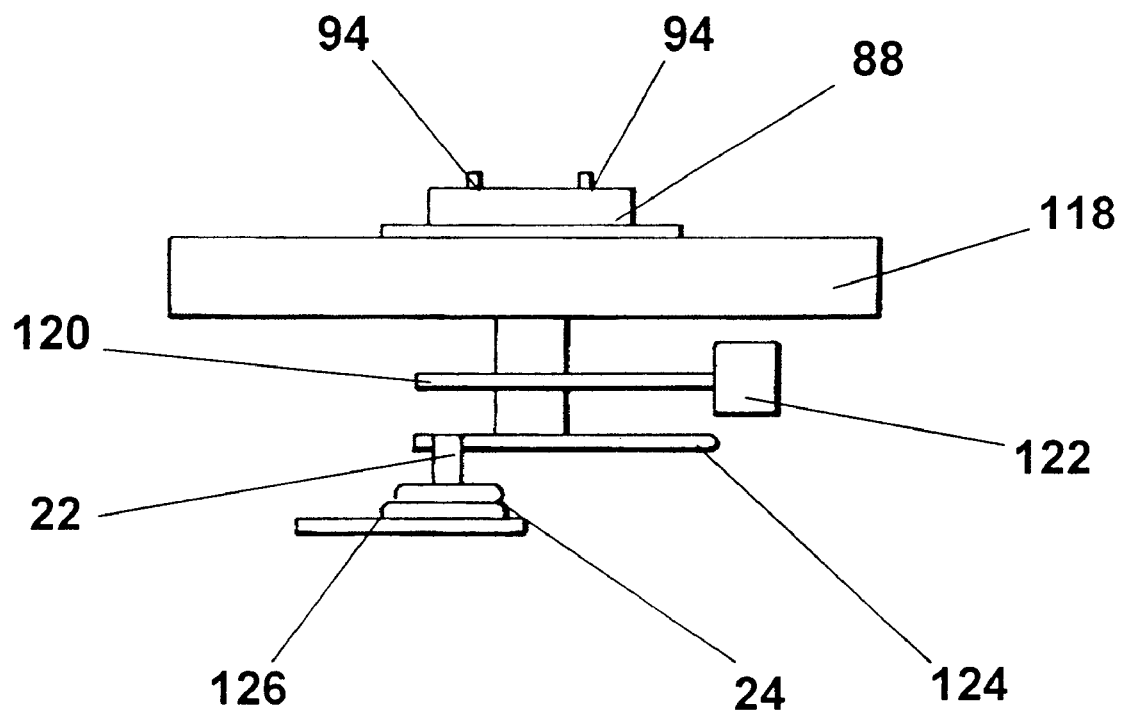
FIG. 9 is a diagrammatic view of part of the mechanism for automatically feeding a retrieving object into the pouch.

FIG. 9 is a diagrammatic side elevation of part of the mechanism for automatically feeding a retrieving object into pouch 12. In this Figure, two of the three locating lugs 94 on hub 88 are shown. Refer also FIG. 6. It will be appreciated that drum 46 and base plate 48 would normally be secured to hub 88.

Located beneath support 118 for hub 88 are two cams. In the case of cam 120, roller 122 is biased to engage cam 120 to ensure a positive engagement. In the case of cam 124, this is adapted to rotate when engaged by protrusion 22 which is on bar 24 and carried on carriage 14 by support 26 (refer FIG. 1). When cam 124 rotates, drum 46 also rotates. The quantum of rotation is such that the next cylinder 76 will be rotated to line up with cut-out 78 on base plate 48.

Figure 10:
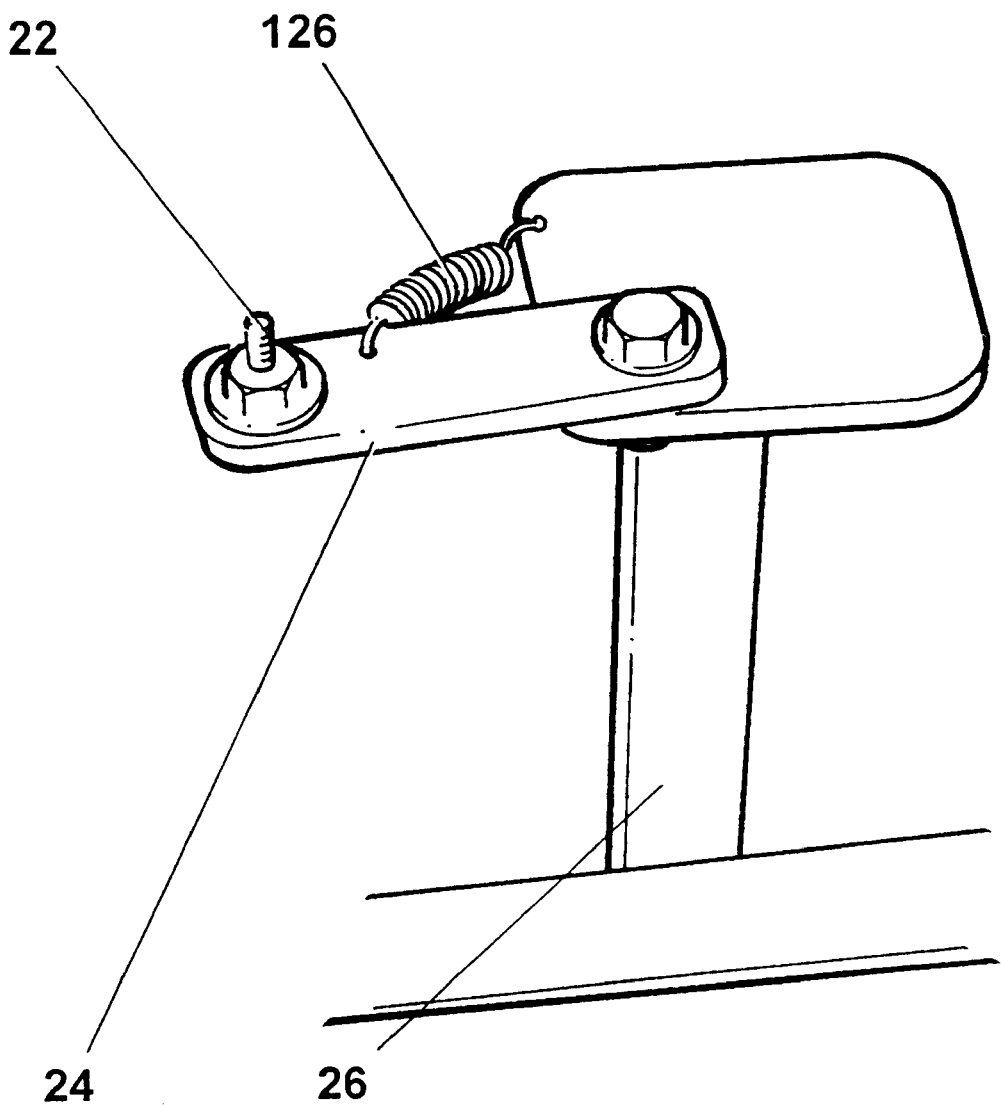
FIG. 10 is a perspective view of part of the mechanism in FIG. 9.

A detail of protrusion 22 and bar 24 carried on support 26 is found in FIG. 10, which also shows spring 126 biasing bar 24. Spring 126 enables protrusion 22 to disengage from cam 124 when carriage 14 moves upwardly.

To summarise the mode of action of apparatus 10, assuming there is no retrieving object in pouch 12 and carriage 14 is in the second or lower position, motor 28 is activated, either by manually switching the plunger switch or by sending a radio signal from a remote transmitter. Machine screw 96 then rotates so that carriage 14 travels to the upper or first position. Just as carriage 14 is reaching that position, a hook beneath pouch 12 is received within slot 110 and latched therein. A small further upward movement of carriage 14 depresses the plunger switch which accordingly reverses the direction of rotation of machine screw 96.

Carriage 14 is then moved back towards the second position, drawing pouch 12 with it against the tensioning force exerted by the elastics 62 (and, if present, 72). As carriage 14 moves beneath drum 46, protrusion 22 engages cam 124 which rotates drum 46 counter-clockwise to align the next (loaded) cylinder 76 with cut-out 78 on base plate 48. By this stage, pouch 12 is aligned with cut-out 78. The retrieving object drops from cylinder 76 through cut-out 78 into pouch 12 and motor 28 stops, carriage 14 having activated a switch to one of the relays in housing 34.

At this stage, apparatus 10 is cocked and ready to catapult the retrieving object in pouch 12 into the air. To carry out the catapulting action, a signal is sent from a hand-held transmitter device to a receiver on apparatus 10. This in turn starts motor 28 which commences to move carriage 14 forwards via machine screw 96.

Trigger 112, which is now situated behind spring 114, encounters spring 114 during the upward movement of carriage 14, is held back and releases the latch holding the hook of pouch 12 in slot 110. The tension in elastics 62 (72) cause pouch 12 to be launched to clear the top of assembly 10. While pouch 12 is restrained from being disconnected from assembly 10 by elastics 62 (72), the retrieving object in pouch 12 is launched into the air.

Apparatus 10 is then ready to repeat the procedure, to automatically load another retrieving object into pouch 12 and to catapult it.

Assembly 10 is relatively easily transportable. To disassemble assembly 10, locking bolt 80 is removed, so that drum 46 can be demounted. Wing-nuts 90 are then loosened so that backing plate 48 can be removed from hub 88.

Battery 54, which in this embodiment is in a cradle which clips onto strut 128 between wheels 52 and 56, is removed.

Next wheels 52 and 56 are removed and the wheel assembly is folded in the same way as known hand-drawn golf buggies. The demounted assembly will then fit into an average-sized vehicle trunk.

To assemble assembly 10, the above procedure is reversed.

In the case of uneven terrain in the field, apparatus 10 can be maintained in an approximately level position by removing wheel 56 or 52, as appropriate.

Transport of assembly 10 in the field is simple. Assembly 10 is balanced on wheels 52 and 56 so that, when the trainer holds handle 40 and walks in a forward (or rearward) direction, assembly 10 adopts a position where frame 18 has its longitudinal axis approximately parallel to the ground and assembly 10 can be wheeled to the desired location.

If desired, frame 18 may be covered by mesh or the like for added safety.

Figure 11:
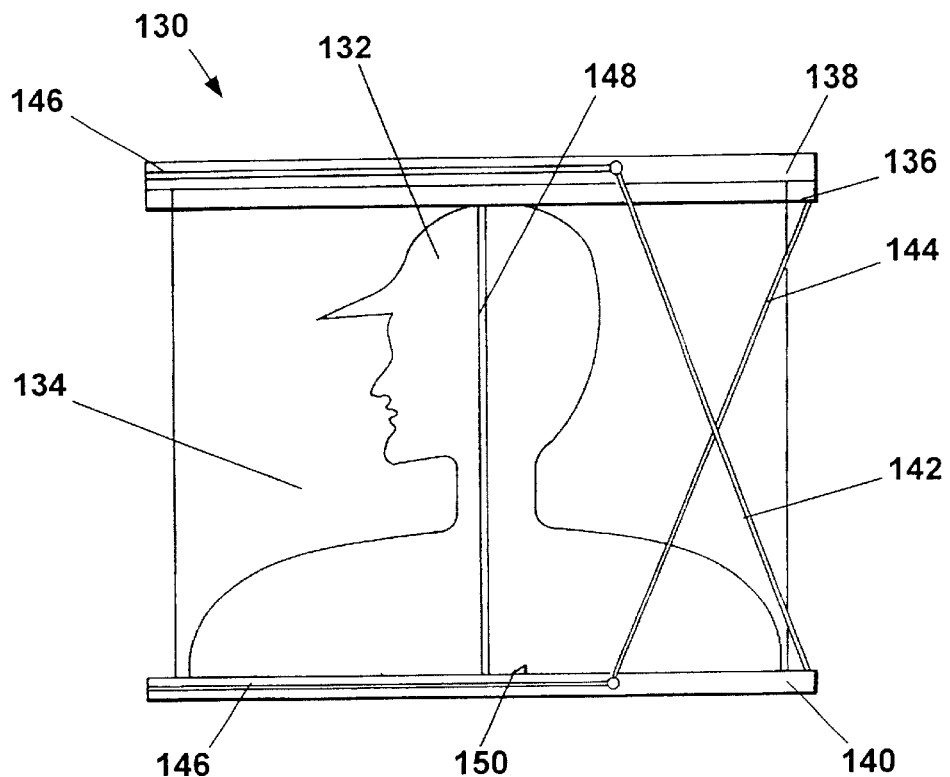
FIG. 11 is rear elevation of an embodiment of the training device of the invention, with the silhouette in "person present" configuration.
Figure 12:
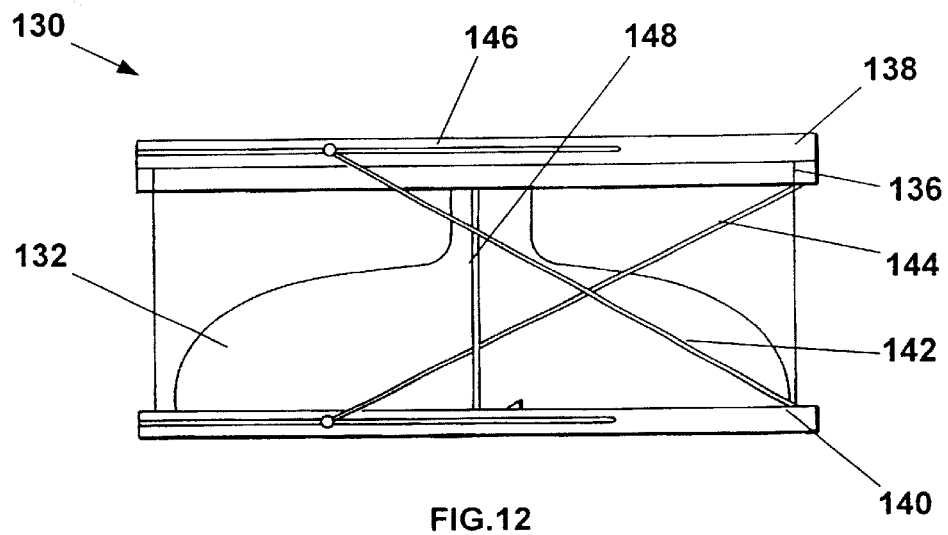
FIG. 12 is a similar view to that in FIG. 11, but showing the training device closing up towards the "person not present" configuration.

FIGS. 11 to 14 illustrate an embodiment of the training device according to the invention. As shown in FIGS. 11 and 12, training device 130 has a silhouette 132 which is mounted on backing material 134. Backing material 134 consists of woven mesh and is almost transparent. Backing material 134, with silhouette 132, can be wound and unwound from roller 136, associated with upper frame 138. Roller 136 works in the manner of a holland blind roller. Training device 130 also includes lower frame 140.

Supporting arms 142 and 144 support upper frame 138 and lower frame 140 respectively. Each of supporting arms 142 and 144 is slidable in a slot 146 in upper and lower frames 138 and 140. Elastic 148 stretches between upper frame 138 and 140 so as to be lightly tensioned when silhouette 132 and backing material 134 are completely unrolled from roller 136. This assists the closing up of upper frame 138 to lower frame 140 during collapsing of training device 130. Mounted on lower frame 140 is a small leaf spring 150. Leaf spring 150 assists the opening of training device 130 by urging frames 138 and 140 apart when training device 130 is in the collapsed position.

It will be appreciated by one skilled in the art that the illustration in FIG. 11 is of the "other person present" configuration. When it is desired to remove the "other person" from the field, training device 130 is caused to collapse. In FIG. 12, training device 130 has partially collapsed and this shows the process of rolling up silhouette 132 and backing material 134 on roller 136, pursuant to which the silhouette will "disappear".

Figure 13:
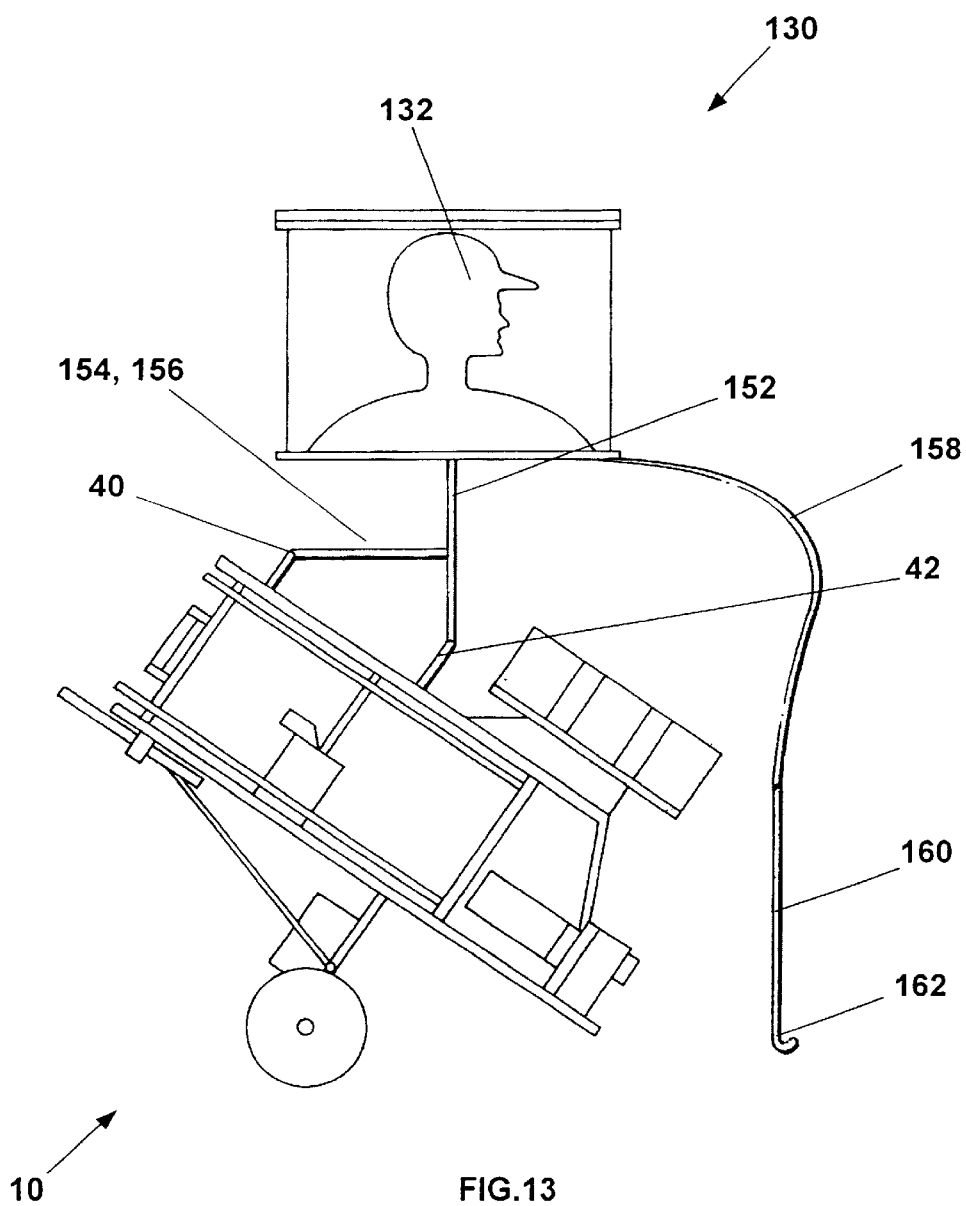
FIG. 13 is a diagrammatic side elevation of the training device of FIGS. 11 and 12 connected to the assembly of FIG. 1 via a connecting tube.

Training device 130 can be mounted on assembly 10 as shown in FIG. 13. Tube 152 is fitted over spigot 44 on handle 42 of assembly 10 (refer FIG. 1). Arms 154 and 156 can be clipped via a suitable clipping device (not shown) to upper handle 40 of assembly 10. Training device 130 can then be mounted on the apex of tube 152. Training device 130 can rotate with tube 152, so that silhouette 132 can be presented at any desired angle. In addition, training device 130 can be locked into position with regard to assembly 10 by suitable means.

It will be noted from FIG. 13 that connected to training device 130 is a cable 158 which in turn is attached to a rod 160 which has at the far end a hook 162. Cable 158 is connected to the base of supporting arm 144. As it will be recalled, arm 144 is slidable within slot 146.

Figure 14:
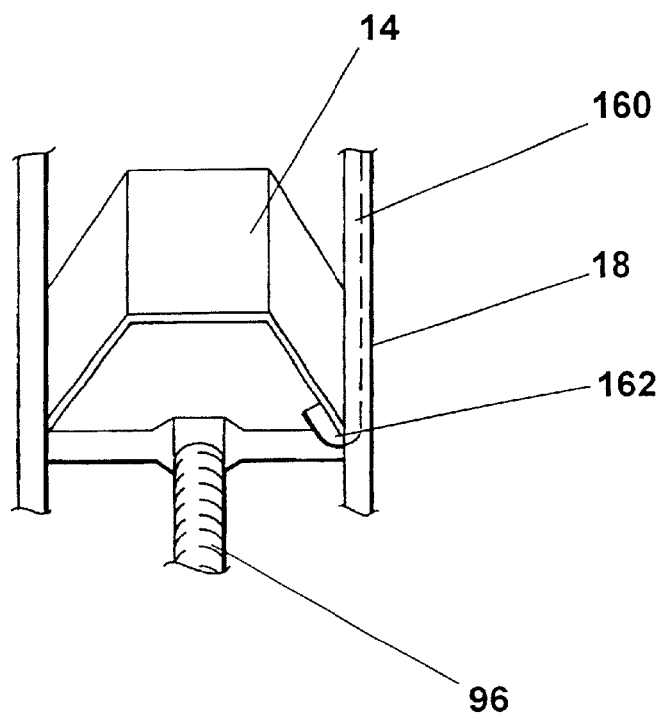
FIG. 14 shows a detail of the cable tube included in FIG. 13 connected with the carriage of the assembly of FIG. 1.

As can be seen from FIG. 14, hook 162 of rod 160 (shown in dashed outline) can be inserted in a channel of frame 18 and engaged by carriage 14.

When carriage 14 is in the cocked position at the second or lower position in assembly 10, there is maximum tension on cable 158 and training device 130 will have silhouette 132 unrolled to its "person present" position. It will be understood that when carriage 14 travels downwardly towards the lower position in assembly 10, the parallelogram configuration of arms 142 and 144, with arm 144 being pulled by cable 158, will cause frames 138 and 140 to separate and silhouette 132 to be unrolled.

Silhouette 132 will be unaffected by the catapulting of pouch 12 and the retrieving object during firing. However, when motor 28 is activated to move carriage 14 to the top or first position in assembly 10, tension on cable 158 will be released and elastic 148 will urge frames 138 and 140 towards each other, thus rolling up silhouette 132 on roller 136 and the "other person" will disappear, to reappear when assembly 10 is converted to the "cocked" position.

If it is desired to maintain the "person present" configuration of training device 130 independently of movement of carriage 14, hook 162 of rod 160 can be engaged on part of frame 18, such as strut 16.

Figure 15:
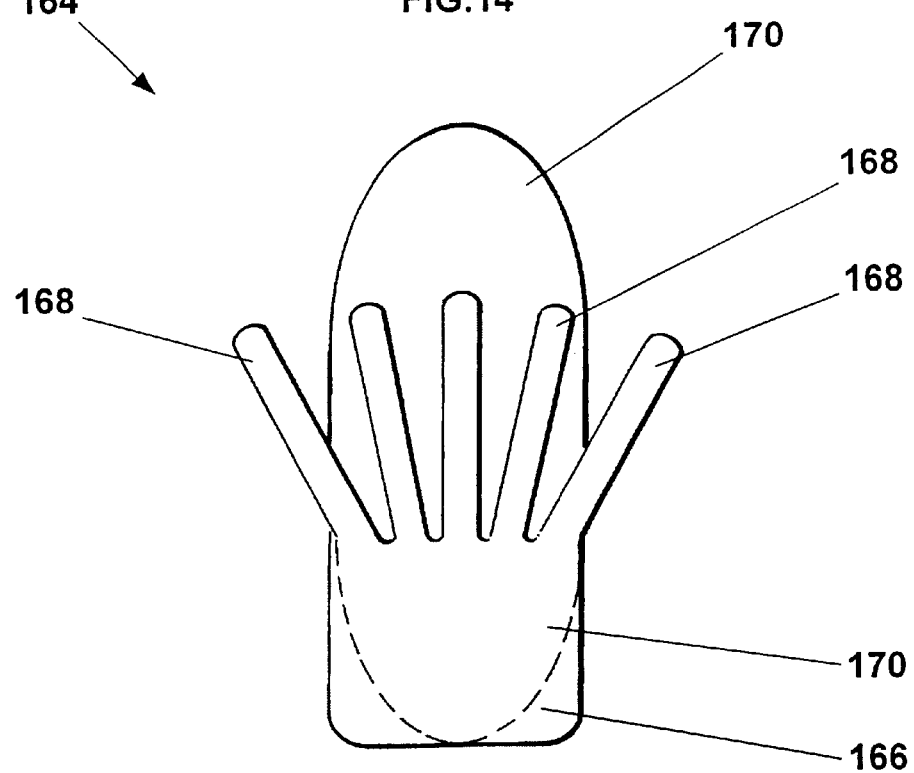
FIG. 15 is a side elevation of an embodiment of a game casing according to the invention.

Although this embodiment of training device 130 has been described using mechanical action to roll and unroll silhouette 132, it is contemplated that a suitable motor may be used instead. Turning now to FIG. 15, this shows the novel game casing 164 of the invention. Game casing 164 in this embodiment has a cup like base 166 and a plurality of fingers 168 which flare out from base 166. An item of game, such as a pigeon, is inserted within game casing 164 as shown in dashed outline 170.

Game casing 164 is made from the base of a "P.E.T." beverage bottle or similar, as earlier described, and has a certain degree of rigidity. This degree of rigidity is sufficient to prevent the game item 170 from flopping forward when it is deposited in pouch 12.

When game item 170, received in game casing 164, is ejected from assembly 10 during firing, game casing 164 falls away from game item 170 and can be collected at the end of the training session, or during it, as desired.

Figure 16:
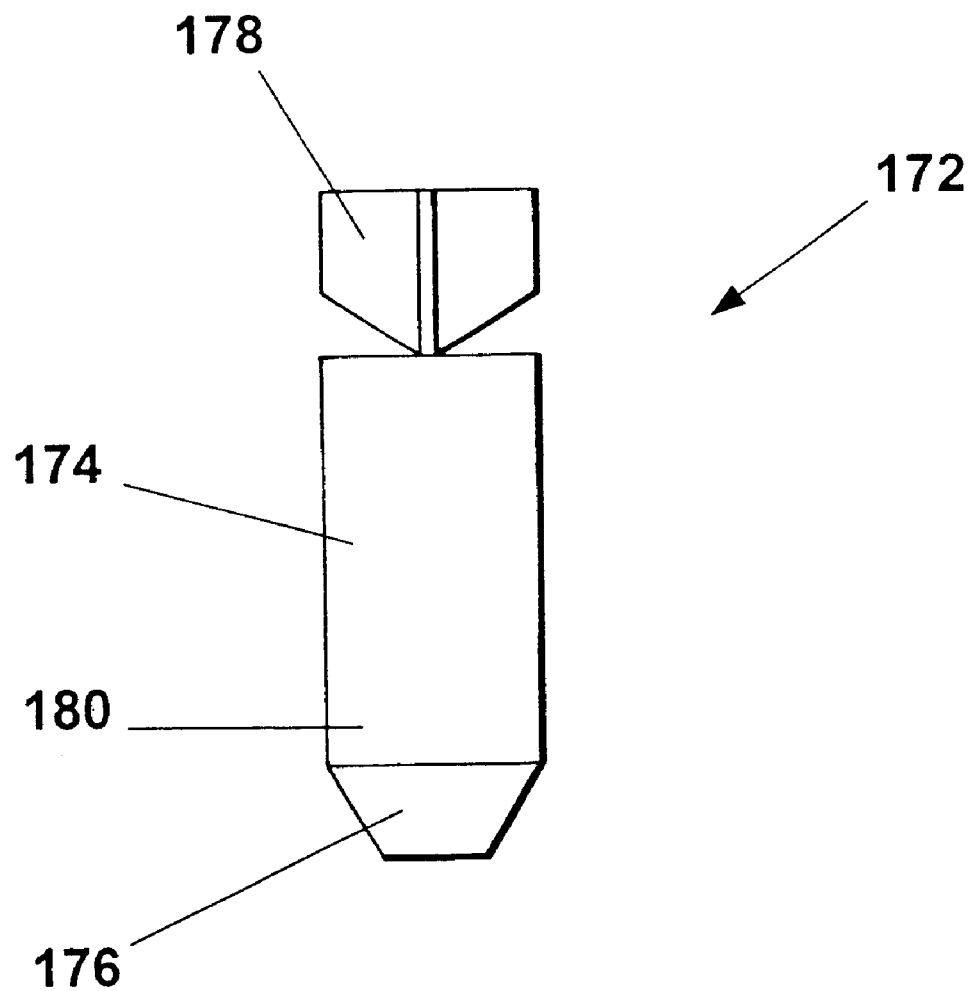
FIG. 16 is a side elevation of an embodiment of a retrieving dummy according to the invention.

Turning now to FIG. 16, this shows a new form of retrieving dummy 172, having an elongated body 174, a tapered nose 176 and, in this embodiment, a pair of fins 178. Retrieving dummy 172 is weighted in the region of the area marked 180, to ensure that the centre of gravity is closer to nose 176 than to fins 178. It is found that this promotes better flight of retrieving dummy 172 from, for example, assembly 10.

It will be appreciated that the present invention, in its several aspects, represents substantial advancements in the art. It will be also be appreciated that the specific embodiments described are not intended to be limiting on the invention but are for the purposes of illustration only.

What is claimed is:

1. A catapult assembly including:
a launching pouch;
tensioning means for the pouch;
a carriage movable between first and second positions;
means for connecting the pouch to the carriage at or near the first, position;
means for drawing the connected pouch and carriage to or near the second position while tensioning the tensioning means;
means for automatically feeding a retrieving object into the pouch when it is cocked in the second position; and
release means for disconnecting the pouch from the carriage.

2. The catapult assembly of claim 1, wherein the tensioning means includes a plurality of rubber bands.

3. The catapult assembly of claim 1, wherein the means for connecting the pouch to the carriage at or near the first position includes a hook on the pouch adapted to be connected by a latch to the carriage.

4. The catapult assembly of claim 3, wherein the release means for disconnecting the pouch from the carriage include a trigger for causing the latch to disconnect from the hook.

5. The catapult assembly of claim 4, wherein the release means are operatable by remote control.

6. The catapult assembly of claim 1, wherein the assembly is mounted on wheels and is demountable for transportation.

7. The catapult assembly of claim 1, comprising a training device for training retriever animals, the device including a silhouette, the silhouette being collapsible.

8. The catapult assembly of claim 7, wherein the silhouette is mounted on a backing material.

9. The catapult assembly of claim 7, wherein the silhouette is mounted on an upper and lower frame and adapted to be wound around a roller associated with the upper frame.

10. The catapult assembly of claim 9, wherein the upper frame is urged toward the lower frame by tensioning means.

11. A catapult assembly including:
a launching pouch, wherein the launching pouch is an aluminium cradle containing a plurality of apertures;
tensioning means for the pouch;
a carriage movable between first and second positions;
means for connecting the pouch to the carriage at or near the first position;
means for drawing the connected pouch and carriage to or near the second position while tensioning the tensioning means;
means for automatically feeding a retrieving object into the pouch when at or near the second position; and
release means for disconnecting the pouch from the carriage.

12. A catapult assembly including:
a launching pouch;
tensioning means for the pouch, wherein the tensioning means includes a plurality of rubber bands, wherein each rubber band is attached to the assembly by a rope and pulley system;
a carriage movable between first and second positions;
means for connecting the pouch to the carriage at or near the first position;
means for drawing the connected pouch and carriage to or near the second position while tensioning the tensioning means;
means for automatically feeding a retrieving object into the pouch when at or near the second position; and
release means for disconnecting the pouch from the carriage.

13. A catapult assembly including:
a launching pouch;
tensioning means for the pouch;
a carriage movable between first and second positions;
means for connecting the pouch to the carriage at or near the first position;
means for drawing the connected pouch and carriage to or near the second position while tensioning the tensioning means, wherein the means for drawing the connected pouch and carriage to or near the second position while tensioning the tensioning means include a motor operated machine screw;
means for automatically feeding a retrieving object into the pouch when at or near the second position; and release means for disconnecting the pouch from the carriage.

14. A catapult assembly including:

a launching pouch;

tensioning means for the pouch;

a carriage movable between first and second positions;

means for connecting the pouch to the carriage at or near the first position;

means for drawing the connected pouch and carriage to or near the second position while tensioning the tensioning means;

means for automatically feeding a retrieving object into the pouch when at or near the second position, wherein the means for automatically feeding a retrieving object into the pouch when at or near the second position include a plurality of open cylinders, each adapted to be positioned above the pouch so that a retrieving object inserted in the cylinder is permitted to fall into the pouch; and release means for disconnecting the pouch from the carriage.

15. A catapult assembly including:

a launching pouch;

tensioning means for the pouch;

a carriage movable between first and second positions;

means for connecting the pouch to the carriage at or near the first position;

means for drawing the connected pouch and carriage to or near the second position while tensioning the tensioning means;

means for automatically feeding a retrieving object into the pouch when at or near the second position;

release means for disconnecting the pouch from the carriage; and a training device for training retriever animals, the device including a collapsible silhouette.

* * * * *